United States Patent Office 2,898,301
Patented Aug. 4, 1959

2,898,301

RUST PREVENTIVE COMPOSITIONS

Raymond L. Mayhew, Phillipsburg, N.J., Joseph P. Copes, Easton, and Earl P. Williams, Pen Argyl, Pa., assignors to General Aniline & Film Corporation, New York, N.Y., a corporation of Delaware No Drawing. Application November 30, 1956
Serial No. 625,228

6 Claims. (Cl. 252—51.5)

The present invention relates to rust preventing compositions suitable for protecting metal surfaces.

It is known that not only moisture but corrosive fluids, bases, etc. readily attack metallic surfaces and cause corrosion, rusting, and other damage to such surfaces. This problem is serious where liquid petroleum hydrocarbons are employed, such as, for example, lubricating oils in internal combustion engines, diesel engines, aircraft engines, turbines and various other machinery and industrial equipment. The damage thus caused is not to the metal surface alone, for rust particles frequently break off and enter the circulating system of engines and cause plugging, clogging and fouling of conduit lines, columns, and the like, are very susceptible to corrosion and must be protected. This problem is also serious wherever ferrous metals are exposed to the elements, such as during machining of steel components, the storage of articles of steel, the use of steel machinery and tools, such as wrenches, hammers, nails, railroad trucks, and others too numerous to mention.

To protect ferrous metal surfaces in contact with corrosive contaminants with a composition which is stable and readily miscible with fluid petroleum hydrocarbons constitutes the principal object of the present invention.

Another object is to form film-forming metal protective compositions which possess lubricating properties.

A further object is to provide an oily rust preventing composition comprising a liquid petroleum hydrocarbon having incorporated therein an active rust inhibiting ingredient.

Other objects and advantages of the invention will become more clearly manifest from the following description.

We have found that various metals subject to rusting and corrosive influences when in contact with liquid petroleum hydrocarbons whether crude or refined can be protected from such influences by incorporating into the liquid petroleum hydrocarbon a rust inhibiting amount of at least one N-substituted-γ-hydroxycarboxylic acid amide having the following general formula:

$$R-\overset{OH}{\underset{|}{CH}}-CH_2CH_2CONHC\overset{R_1}{\underset{R_{11}}{\diagdown}}$$

wherein R represents either hydrogen or a methyl group, $R_1$ represents an organic radical, devoid of water solubilizing groups such as sulfonic or carboxylic acid groups, containing from 10 to 30 carbon atoms, e.g. decyl, undecyl, undecylenyl, hendecyl, dodecyl, tridecyl, tetradecyl, cetyl, myristolenyl, pentadecyl, heptadecyl, hexadecyl, hexadecenyl, octadecyl, octadecenyl, octadecadienyl, abietinyl, dehydroabietinyl, dihydroabietinyl, oleyl, elaidyl, erucyl, monylbenzyl, octylbenzyl, diamylbenzyl, dioctylbenzyl, etc., and mixtures of such radicals, and $R_{11}$ represents either hydrogen or an alkyl group of from 1 to 18 carbon atoms, e.g. methyl, propyl, butyl, amyl, hexyl, nonyl, decyl, dodecyl, cetyl, octadecyl, etc., the total number of carbon atoms constituting the groups in both $R_1$ and $R_{11}$ being a minimum of 10 and not more than 48 carbon atoms.

The compounds characterized by the foregoing formula and utilized with the present invention are obtained by the reaction of one mole of an organic primary amine or mixtures of such amines containing from 10 to 40 carbon atoms with one mole of either γ-butyrolactone or γ-valerolacetone at a temperature of 80–95° C. as disclosed in application Ser. No. 625,224, filed on November 30, 1956. The complete disclosure which is incorporated herein by reference to the various compounds per se which are useful as rusting inhibitors and to the method of preparing the same.

As illustrative examples of the rust inhibiting agents, characterized by the foregoing formula, the following may be mentioned:

(1) $HO-CH_2-CH_2-CH_2CONHCH_2(CH_2)_8CH_3$

The reaction product of N-decylamine and γ-butyrolactone.

(2)
$$CH_3-\overset{OH}{\underset{|}{CH}}-CH_2CH_2CONHCH_2(CH_2)_8CH_3$$

The reaction product of N-decylamine and γ-valerolactone.

(3) $HO-CH_2-CH_2-CH_2CONHCH_2(CH_2)_{10}CH_3$

The reaction product of N-dodecylamine and γ-butyrolactone.

(4) $HO-CH_2-CH_2-CH_2CONHCH_2(CH_2)_{14}CH_3$

The reaction product of N-cetylamine and γ-butyrolactone.

(5) $HO-CH_2-CH_2-CH_2CONHCH_2(CH_2)_{16}CH_3$

The reaction product of octadecylamine and γ-butyrolactone.

(6) The reaction product of 1 mole (86.1 grams) of γ-butyrolactone with 1 mole (274 grams) of a commercially available mixture of amines having the following composition: hexadecylamine 10%, octadecylamine 10%, octadecenylamine 35%, octadecadienylamine 45%.

(7) The reaction product of 1 mole (86.1 grams) of γ-butyrolactone and 1 mole (365 grams) of a commercially available mixture of amines having the following composition: octadecenylamine 15%, octadecadienylamine 15%, abietylamine 70%.

(8) The reaction product of 1 mole (86.1 grams) of γ-butyrolactone and 1 mole (276 grams) of a commercially available mixture of amines having the following composition: hexadecylamine 6%, octadecylamine 93%, octadecenylamine 1%.

(9) The reaction product of 1 mole (86.1 grams) of γ-butyrolactone and 1 mole (317 grams) of a commercially available primary amine made from a modified rosin (dehydroabietylamine) having the following formula:

(10) The reaction product of 0.2 mole (7.2 grams) of γ-butyrolactone with 0.2 mole (58.9 grams) of the monoamide prepared from coconut oil and ethylenediamine in the usual manner.

(11) The reaction product of 1 mole of γ-butyrolactone with 1 mole of dodecylbenzylamine.

(12) The reaction product of 0.5 mole (43 grams) γ-butyrolactone with 0.48 mole (320 grams) of polymerized fatty acid octaethylene amine. The latter is available on the market under the brand name of Empol 1022 and is derived from essentially a $C_{36}$ dibasic acid resulting from the polymerization of naturally occurring unsaturated $C_{18}$ fatty acids. The general properties are as follows:

| | |
|---|---|
| Molecular weight approx. | 600 |
| Acid value, mg. KOH/g. min | 180 |
| Saponification value, mg. KOH/g. min | 185 |
| Neutralization equivalent | 289–304 |
| Dimer content percent | 75 |
| Trimer content do | 22 |
| Monomer content do | 3 |
| Sp. gr., 15.5° C. | 0.95 |
| Viscosity at 25° C. centistokes | 10,000 |

The rust preventing components utilized in accordance with the present invention are employed in all fluid petroleum hydrocarbons and mixtures thereof having a boiling range from 40° C. to 500° C. and include gasolines, kerosene, gas oils, petroleum naphtha, and petroleum naphtha cuts, mineral spirits, mineral seal oil, benezene, cumene, butylbenzene, paraffines, e.g. hexane, octane, nonane, decane, etc. and mixtures thereof, cycloparaffines, e.g. cyclohexane, isopropyl cyclohexane, n-butyl cyclohexane, etc. and mixtures thereof, transforming oils, diesel oil, cutting oils, slushing oils, lubricating oils and the like, whether in the crude or refined form. The N-substituted-δ-hydroxy-carboxylic acid amides characterized by the foregoing general formula and mixtures of such compounds are soluble in all of the aforementioned liquid petroleum hydrocarbons to the extent of rust inhibiting amounts which range from 0.1 to 5% by weight of the fluid petroleum hydrocarbon.

The rust inhibiting components are incorporated into the fluid petroleum hydrocarbon in rust inhibiting amounts of the aforestated range, and the mixture heated from 50–150° C., usually 70–100° C. so as to obtain a stable solution. Such mixture exhibits outstanding rust inhibition in the presence of steel drums, storage tanks, and in the presence of ferrous and steel metals under severe rust producing environment as will be noted from the following working examples.

In some fluid petroleum hydrocarbon compositions the rust inhibiting properties are enhanced by using the product resulting from the heating of one mole of the N-substituted-δ-hydroxy-carboxylic acid amide with one mole of an organic base such as monoethanolamine, diethanolamine, ethylethanolamine, butanolamine, pentanolamine, hexanolamine, cyclohexylethanolamine, laurylolamine, dialkylalkylolamine, tris (hydroxymethyl) amino methane, etc. A heating period of two hours at 120–180° C. is sufficient and the mixture allowed to cool to room temperature. This is an addition product with no water or other substances being split out chemically. The resulting product is readily compounded with various fluid petroleum hydrocarbons of the aforementioned type by merely mixing and heating at a temperature from say 40–150° C. usually below 120° C. Sometimes no heating at all is required to produce a stable solution. The mixture is thereafter stirred to insure homogeneity and allowed to cool. In general, the rust inhibiting properties of the fluid petroleum hydrocarbons prepared in accordance with the present invention are so good that the addition product with diethanolamine, etc. is not necessary.

The unusual feature of the rust additives utilized in accordance with the present invention is that when used with gasolines, diesel oils and other fuels for internal combustion engines, they leave no residue upon ignition. In view thereof, there are no complications connected with their use, such as fouling of spark plugs, glowing deposits to cause pre-ignition, no sticking valves or rings, etc.

In order to better disclose the invention in detail, the following examples are furnished. It is to be clearly understood that these examples are illustrative only and are not intended to limit the scope to the invention claimed.

All the parts given are by weight.

*Example I*

The product of illustration (6) was incorporated into a crankcase type of lubricating oil having an initial boiling point of 365° C. at 760 mm. Two samples were utilized. In one sample 0.5% by weight was employed and in the second 2% by weight. Solution of the two samples was effected by heating to 60° C. and followed by cooling to room temperature. The resulting compositions were tested according to the Baker, Jones, Zisman Drop Test [Ind. Eng. Chem. 40, p. 2338 (1948) and 41, p. 137 (1949)]. In this test a steel specimen was submerged in oil in the inhibitor and a drop of water brought in contact with the steel. After two days at 60° C. there were no visible signs of rusting in the test pieces of the two samples of the lubricating oil containing the rust inhibitors. The lubricating oil without the rust inhibitor permits the drop of water to rust the specimen in a very few hours, sometimes in a matter of minutes.

The two solutions were further tested as follows:

Steel turnings were immersed in each of them, drained and stored in the corrosive environment of a humidity cabinet which cycled every two hours through 100% relative humidity at 55 to 60° C. At the end of a two week period no rust was evident on the turnings in either case. Untreated oil allowed rust to form in a few hours.

*Example II*

Example I was repeated with the exception that the product of illustration (6) was replaced by the product of illustration (8). In this case the mixtures were heated to about 105° C. before cooling to effect solution. The two solutions were subjected as in Example I to the same Baker et al. drop test. At the end of the two day period at 60° C. no visible rust was present.

The two compositions were further tested as follows:

Steel turnings were immersed in each of them, drained and stored in the corrosive environment of a humidity cabinet which cycled every two hours through 100% relative humidity at 55 to 60° C. At the end of a two week period no rust was evident on the turnings in either case. The turnings from untreated oil rusted within a few days.

*Example III*

Example I was again repeated with the exception that the product of illustration (6) was replaced by the product of illustration (7). Heating to effect solution was at 80° C. The results obtained were substantially the same as in Example I.

In the case of the steel turnings in the humidity cabinet, no traces of rust were present after six days. Turnings from untreated oil rusted within a few hours.

*Example IV*

Example I was repeated with the exception that the product of illustration (6) was replaced by the product of illustration (5). In the case of the Baker, Jones, Zisman test, no rust was evident at the end of 2 days at 60° C.

In the case of the steel turnings in the humidity cabinet, the 2% solution permitted no traces of rust for 3 days, and only very slight rusting at the end of 10 days. In the case of the 0.5%, there was only slight rusting at the end of 3 days.

*Example V*

The product of illustration (12) was compounded with petroleum ether (boiling range 90–100° C.) at 2% and 0.5%, and subjected to humidity cabinet chip test. At the end of 10 days the 2% solution allowed only 10% of the surfaces to rust, the 0.5% somewhat more. The petroleum ether alone would allow 100% coverage of rust overnight.

The compounds of illustrations 1–12 have actually been tested as rust inhibitors in high boiling petroleum ether and in crankcase mineral oil. They have also exhibited corrosion inhibition when used in kerosenes. They are soluble in gasoline, kerosene, light mineral oil (paraffin base specific gravity 60° F. 0.835/0.845, Saybolt viscosity 100° F., 65/75), toluene Velsicol AR-50 (a mixture of aromatic and non-aromatic hydrocarbons, the aromatics of which are methylated naphthalenes) warm benzene, xylene, hexane, etc.

We claim:

1. An anti-rust composition comprising a fluid petroleum hydrocarbon containing in a rust inhibiting amount of at least one N-substituted-γ-hydrocarboxylic acid amide having the following formula:

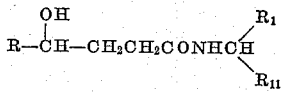

wherein R represents a member selected from the class consisting of hydrogen and methyl group, $R_1$ represents a hydrocarbon radical containing from 10 to 30 carbon atoms, and $R_{11}$ represents a member selected from the class consisting of hydrogen and an alkyl group of from 1 to 18 carbon atoms, the total number of carbon atoms constituting the groups in both $R_1$ and $R_{11}$ being at least 10 and not more than 48 carbon atoms.

2. An anti-rust composition according to claim 1 wherein the N-substituted-γ-hydroxycarboxylic acid amide has the following formula:

$$HO-(CH_2)_3-CONHCH_2(CH_2)_{16}CH_3$$

3. An anti-rust composition according to claim 1 wherein the N-substituted-γ-hydroxycarboxylic acid amide is the reaction product of 1 mole of γ-butyrolactone with 1 mole of a mixture of amines consisting of 10% hexadecylamine, 10% of octadecylamine, 35% of octadecenylamine and 45% of octadecadienylamine.

4. An anti-rust composition according to claim 1 wherein the N-substituted-γ-hydroxycarboxylic acid amide is the reaction product of 1 mole of γ-butyrolacetone with 1 mole of a mixture of amines consisting of 15% of octadecenylamine, 15% of octadecadienylamine and 70% of abietylamine.

5. An anti-rust composition according to claim 1 wherein the N-substituted-γ-hydroxycarboxylic acid amide is the reaction product of 1 mole of γ-butyrolacetone with 1 mole of a mixture of amines consisting of 6% hexadecylamine, 93% octadecylamine and 1% octadecenylamine.

6. An anti-rust composition according to claim 1 wherein the N-substituted-γ-hydroxycarboxylic acid amide is the reaction product of 1 mole γ-butyrolacetone with 1 mole dehydroabietylamine.

References Cited in the file of this patent
UNITED STATES PATENTS
2,548,156   Gresham et al.   Apr. 10, 1951